May 31, 1960 H. R. HASTINGS ET AL 2,939,078
ELECTRICAL MEASURING INSTRUMENT
Filed Aug. 12, 1955

INVENTORS
Homer R. Hastings &
BY Clarence A. Haut
J. W. Lovett
ATTORNEY

United States Patent Office 2,939,078
Patented May 31, 1960

2,939,078

ELECTRICAL MEASURING INSTRUMENT

Homer R. Hastings and Clarence A. Haut, Flint, Mich., assignor to General Motors Corporation, Detroit, Mich., a corporation of Delaware Filed Aug. 12, 1955, Ser. No. 528,000

1 Claim. (Cl. 324—146)

This invention relates to electrical measuring instruments and more particularly to gauges such as ammeters of the type employed in automotive vehicles to indicate the magnitude and direction of current flow.

It is highly advantageous in this type of instrument that the construction be as simple and low in cost as possible. It should also be capable of utilizing a uniform calibration scale on a dial to give an accurate reading as brought about by a strong pointer or indicator needle movement.

An object of this invention is to provide an improved electrical measuring instrument capable of giving a strong and uniform pointer movement. Another object is to provide an improved electrical measuring instrument requiring a minimum number of parts.

To these ends, a feature of the invention comprises a conductive frame having a U-shaped section in which an armature is rotatable and a pole piece extending along opposite sides of the section to affect the armature magnetically. Another feature is a conductor frame having a U-shaped section with sides curved about the axis of movement of a pointer. Still another feature is a pole piece having parallel and flat end walls extending along opposite sides of a U-shaped frame section. Another feature is a U-shaped conductor section extending outwardly from the shaft of a rotatable and magnetic armature and towards the sides of the armature.

These and other important features of the invention will now be described in detail in the specification and then pointed out more particularly in the appended claim.

In the drawings:

Fig. 1 is a front elevation of an ammeter in which the present invention is embodied, parts of the instrument being broken away along the line 1—1 of Fig. 2 for clarity of illustration;

Fig. 2 is a view of the operative parts shown in Fig. 1 omitting the instrument casing and looking in the direction of the arrows 2—2; and Fig. 3 is a detail view of the armature and pointer assembly as utilized in the instrument of Figs. 1 and 2.

The instrument as disclosed in the drawings comprises a one-piece conductor frame generally indicated at 10 and a dial 12 fixed to the frame by means of rivets 14 and 16, the frame being joined to an insulator plate 18 of laminated material such as Bakelite coated fabric by means of two terminal posts 20 and 22.

Insulator plate 18 is so formed that it is capable of supporting the frame 10 and dial 12 within a casing 24 leaving clearance or insulating space 26 between the casing and the dial 12.

The frame 10 is a one-piece stamping cut from a single sheet of ordinary soft non-magnetic metal such as brass. It comprises two wings 30 and 32 strengthened by upturned lip portions 34 and 36. Major portions of these wings lie in a horizontal plane. The wing 30 is bent downwardly at one end to form a flange 38 to receive the rivet 14. The wing 32 is flanged at 40 to receive the rivet 16. The wing 32 also is provided with a downwardly extending and integral arm 42 which is adapted to rotatively support one end of a shaft 46. The flanges 38 and 40 form a front plate to hold the dial 12 and also have portions 48 and 50 which extend normal to the dial 12 and are integral with coplanar portions 52 and 54. The latter in turn support and are integral with a U-shaped section 55, one inside surface of which is provided with a ridge having one raised portion 56 with a recess in which one end of the shaft 46 is journaled and two raised end portions 57. The section 55 has opposed walls 58 and 60 which are curved about the axis of the shaft 46 as is plainly seen in Fig. 1. The U-shaped section 55 constitutes an end portion of the frame and extends vertically to join the wings 30 and 32 together. The ends of the wings 30 and 32 adjacent the insulator plate 18 are flanged as at 61 and 62 and these flanges are joined by an integral bridge or jumper 64 to form a back or supporting plate.

The dial 12 is made of any material customarily used for the purpose and may be aluminum or other non-magnetic metal or cardboard and is provided with indicia 66 consistent with the use of the instrument.

Interposed between the section 55 and the dial 12 is a U-shaped pole piece 68 of iron characterized by low retentivity, the opposite or opposed sides 72 and 74 of which are flat and parallel and bear tabs 76 and 78 placed in interlocked relation with the frame. The term "low retentivity" is used to indicate that the pole piece is not permanently magnetized.

A conventional counterweight 80 is fixed to the shaft 46 in such position as to tend to retain a pointer 82 in its central position. The pointer is fixed to the shaft 46 to rotate therewith and it is so formed as to extend forwardly through the usual arcuate slot 84 formed in the dial.

An annular flange 86 is fixed to the shaft 46 and also attached to the latter is a permanent magnet 88 which is confined between the flange 86 and the end of the pointer 82 affixed to the shaft. The magnet or armature 88 is provided with opposite curved edges which are concentric with and spaced from the walls 58 and 60 of the U-shaped section 55 of the frame 10.

In operation, current is conducted through the frame 10 by way of the two terminal posts 20 and 22 and thereby sets up a magnetic field around the frame. The armature 88, being a permanent magnet, moves to line up with the magnetic field around the frame. The pole piece 68, being of iron, attracts the armature and thereby reduces the extent of rotation of the latter as caused by the magnetic field around the frame. The latter is so shaped as closely to approach the curved end edges and sides of the ends of the amature 88 to cause the latter to link with a large amount of flux set up by the current. Because the frame section sides 58 and 60 are curved to follow the rotational arc of the armature, a uniform clearance is provided giving a strong and substantially uniform pointer movement for each variation in increment of current flow.

The bridge or jumper 64 may be eliminated altogether when small amperages are to be measured or it may be made smaller or larger to suit requirements. The amperage capacity of the instrument may be increased by enlarging the cross section of the bridge 64.

It should be noted that the opposite walls 72 and 74 of the pole piece are not curved concentrically to conform with the frame. With this arrangement, as disclosed, the pointer 82 will stand sharply on zero when no current is flowing through the frame 10. When current is flowing, uniformity of instrument reading, permitting evenly spaced indicia 66 on the dial, is not adversely affected because of this non-curvature of the pole piece walls.

We claim:

An electrical measuring instrument comprising a dial, a conductive frame of nonmagnetic material, said frame including side wings connected by a U-shaped section near one end of said frame, a terminal post connected to each of said wings at the other end of said frame, a permanently magnetized armature in plate form pivotally mounted on said frame for rotation about an axis and within said section, flanges integral with said one end of said frame and fixed to said dial to support the latter, a pointer extending along the face of said dial and fixed to said armature to rotate therewith, said U-shaped frame section having twin portions with facing surfaces, each of said surfaces having an axis of curvature substantially coinciding with the axis of said armature, a ridge on said section facing said armature and traversing said armature axis, a U-shaped iron pole piece characterized by low retentivity and having an intermediate portion interposed between said dial and U-shaped frame section, end portions of said pole piece being flat and arranged outside said twin portions of the frame and in alignment with said ridge for influencing the zero positioning of said pointer, and said dial and flanges lying in parallel planes extending perpendicular to the axes of the said terminal posts and armature.

References Cited in the file of this patent
UNITED STATES PATENTS

| | | |
|---|---|---|
| 1,735,919 | Eshbaugh | Nov. 19, 1929 |
| 1,761,917 | Helgeby | June 3, 1930 |
| 2,446,431 | Pfeffer | Aug. 3, 1948 |
| 2,624,769 | Diehl | Jan. 6, 1953 |
| 2,867,768 | Fribance | Jan. 6, 1959 |